US010152366B2

(12) United States Patent
Togawa

(10) Patent No.: US 10,152,366 B2
(45) Date of Patent: Dec. 11, 2018

(54) LOG ANALYSIS SYSTEM, FAULT CAUSE ANALYSIS SYSTEM, LOG ANALYSIS METHOD, AND RECORDING MEDIUM WHICH STORES PROGRAM

(71) Applicant: NEC Corporation, Minato-ku, Tokyo (JP)

(72) Inventor: Ryosuke Togawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 99 days.

(21) Appl. No.: 15/021,740

(22) PCT Filed: Aug. 21, 2014

(86) PCT No.: PCT/JP2014/004275
§ 371 (c)(1),
(2) Date: Mar. 14, 2016

(87) PCT Pub. No.: WO2015/045262
PCT Pub. Date: Apr. 2, 2015

(65) Prior Publication Data

US 2016/0224402 A1 Aug. 4, 2016

(30) Foreign Application Priority Data

Sep. 24, 2013 (JP) ................................ 2013-197416

(51) Int. Cl.
*G06F 11/00* (2006.01)
*G06F 11/07* (2006.01)

(52) U.S. Cl.
CPC ........ *G06F 11/079* (2013.01); *G06F 11/0778* (2013.01)

(58) Field of Classification Search
CPC .......................... G06F 11/079; G06F 11/0778
See application file for complete search history.

(56) References Cited

U.S. PATENT DOCUMENTS 5,119,377 A * 6/1992 Cobb .................... G06F 11/366 714/38.11
5,463,768 A * 10/1995 Cuddihy ............ G06F 11/2205 714/37

(Continued)

FOREIGN PATENT DOCUMENTS

JP H11-224214 A 8/1999
JP 2006-318071 11/2006

(Continued)

OTHER PUBLICATIONS

*CAFC,Electric Power Group, LLC* v. *Alstom S.A.*, pp. 1-12 (Year: 2016).*

(Continued)

*Primary Examiner* — Marc Duncan
*Assistant Examiner* — Jonathan D Gibson

(57) ABSTRACT

An objective of the present invention is to appropriately extract, or assist in extracting, a normal operation pattern from a normal operation log. A log file including information wherein a plurality of log records is ordered in time series is segmented into a plurality of log groups according to prescribed rules. A plurality of patterns which are configured by a plurality of events which are contiguous in time series is extracted from the plurality of log groups, and the patterns are associated with frequency information which represents how many log records the pattern is extracted from. The pattern to be outputted from the plurality of patterns is selected on the basis of an inclusion relation between the plurality of events which are contiguous in time series and configure a given pattern and the plurality of events which are contiguous in time series and configure other patterns, and on the basis of the frequency information which is associated with the patterns.

8 Claims, 16 Drawing Sheets

INFORMATION PROCESSING SYSTEM 900
NORMAL LOG 910
LOG ANALYSIS SYSTEM 100
NORMAL PATTERN 920
NORMAL-PATTERN STORAGE UNIT 200

(56) References Cited

U.S. PATENT DOCUMENTS 5,982,995 A * 11/1999 Covert .................. G03G 15/55 358/1.13
6,654,915 B1 * 11/2003 Lu ...................... G06F 11/0748 714/43
6,865,508 B2 * 3/2005 Ueki .................. G06F 11/3616 702/181
7,614,043 B2 * 11/2009 Ognev ................. G06F 11/366 706/12
7,721,152 B1 * 5/2010 Joshi .................. G06F 11/0709 714/15
8,032,866 B1 * 10/2011 Golender ............. G06F 11/366 717/128
8,112,667 B2 * 2/2012 Belluomini ....... G06F 17/30675 707/603
8,990,378 B2 * 3/2015 Caner ................ H04L 41/0631 709/224
9,465,684 B1 * 10/2016 Carter ................ G06F 11/0766
2002/0046273 A1 * 4/2002 Lahr .................. G06F 11/3495 709/224
2004/0059966 A1 * 3/2004 Chan .................. G06F 11/0709 714/48
2009/0144699 A1 * 6/2009 Fendt .................. G06F 11/004 717/120
2010/0088354 A1 * 4/2010 Wu .................... G06F 11/3409 707/827
2010/0281154 A1 * 11/2010 Bedi .................. G06F 11/2294 709/224
2011/0154117 A1 * 6/2011 Danielson ........... G06F 11/0748 714/37
2012/0278694 A1 * 11/2012 Washio .............. G06F 17/2288 715/205
2013/0227352 A1 * 8/2013 Kumarasamy ...... G06F 11/3072 714/47.1

FOREIGN PATENT DOCUMENTS

JP 2010-128661 A 6/2010
JP 2011-002870 A 1/2011
JP 4944391 B 3/2012
JP 2012-123694 6/2012
JP 2012-168702 A 9/2012
JP 2012-194604 A 10/2012

OTHER PUBLICATIONS

International Search Report for PCT Application No. PCT/JP2014/004275, dated Oct. 28, 2014.
English translation of Written opinion for PCT Application No. PCT/JP2014/004275.

* cited by examiner

Fig. 2

NORMAL LOG 910

| TIME POINT AT WHICH EVENT OCCURRED | EVENT ID |
|---|---|
| 09:04:01 | A |
| 09:04:02 | B |
| 09:04:03 | C |
| 09:04:04 | X |
| 09:04:05 | Y |
| 09:04:06 | A |
| 09:04:07 | B |
| 09:04:08 | C |
| 09:04:09 | A |
| 09:04:10 | B |
| 09:04:11 | C |
| 09:04:12 | A |
| 09:04:13 | X |
| 09:04:14 | B |
| 09:04:15 | C |
| 09:04:16 | Y |
| ... | ... |

LOG ANALYSIS SYSTEM 100
NORMAL LOG 910
DIVISION UNIT 110
EXTRACTION UNIT 120
SELECTION UNIT 130
NORMAL-PATTERN EXTRACTION UNIT 140
NORMAL-PATTERN STORAGE UNIT 200

Fig. 4

| TIME INFORMATION | LOG GROUP | LOG ID |
|---|---|---|
| 09:04:01～09:04:05 | 1 | ABCXY |
| 09:04:06～09:04:10 | 2 | ABCAB |
| 09:04:11～09:04:15 | 3 | CAXBC |
| 09:04:15～09:04:20 | 4 | YABCX |
| 09:04:21～09:04:25 | 5 | YXYXY |
| ... | ... | ... |

Fig. 5

| NUMBER OF ELEMENTS | PATTERN | FREQUENCY |
| --- | --- | --- |
| 1 | A | 51 |
| 1 | B | 53 |
| ... | ... | ... |
| 2 | AB | 46 |
| 2 | XY | 43 |
| ... | ... | ... |
| 3 | ABC | 43 |
| 3 | BCX | 7 |
| 3 | YAB | 5 |
| 3 | CXY | 3 |
| ... | ... | ... |
| 4 | ABCX | 17 |
| 4 | BCXY | 3 |
| 4 | AXBC | 1 |
| ... | ... | ... |
| 5 | ABCDE | 1 |
| ... | ... | ... |

Fig. 7

| CHILD PATTERN | FREQUENCY | NUMBER OF PARENTS TO WHICH CHILD PATTERN BELONGS |
|---|---|---|
| ABC | 43 | 8 |
| XY | 39 | 6 |
| XAB | 29 | 2 |
| XBC | 27 | 2 |
| ... | ... | ... |

LOG ANALYSIS SYSTEM 100
CPU
1
MEMORY
2
STORAGE
DEVICE
3
COMMUNICATION
INTERFACE
4
INPUT
DEVICE
5
OUTPUT
DEVICE
6
DRIVE
7
STORAGE MEDIUM 8

LOG ANALYSIS SYSTEM 101
NORMAL LOG 911
CONVERSION UNIT 150
DIVISION UNIT 110
EXTRACTION UNIT 120
SELECTION UNIT 130
NORMAL-PATTERN EXTRACTION UNIT 140
NORMAL-PATTERN STORAGE UNIT 200

Figures 11A, 11B, 11C:
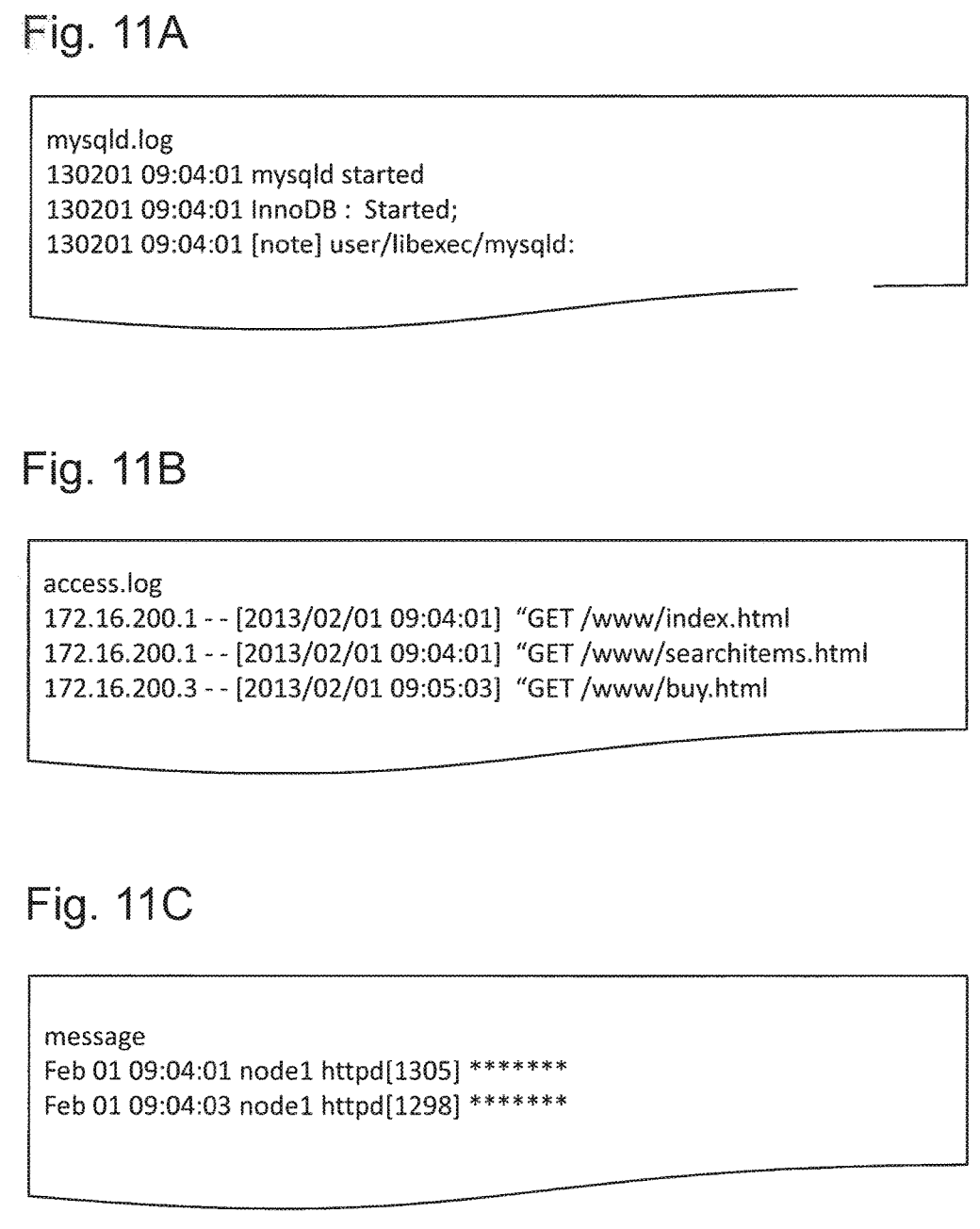

Fig. 11A mysqld.log
130201 09:04:01 mysqld started
130201 09:04:01 InnoDB : Started;
130201 09:04:01 [note] user/libexec/mysqld:

Fig. 11B access.log
172.16.200.1 - - [2013/02/01 09:04:01] "GET /www/index.html
172.16.200.1 - - [2013/02/01 09:04:01] "GET /www/searchitems.html
172.16.200.3 - - [2013/02/01 09:05:03] "GET /www/buy.html

Fig. 11C message
Feb 01 09:04:01 node1 httpd[1305] *******
Feb 01 09:04:03 node1 httpd[1298] *******

Fig. 12

| ANALYSIS PERIOD | LOG ELEMENT |
|---|---|
| 2013/07/01 09:00:00 ~ 2013/07/01 18:00:00 | TIME AND DATE (yyyy/MM/DD,HH:mm:ss), LOG ID |

Fig. 13

| LOG ID | RECORD EXPRESSION |
|---|---|
| A | mysqld started |
| B | [note] ***/***/***/mysqld failed |
| C | ***.***.***.*** stopped |

START
CONVERT LOG FILE
S201
DIVIDE LOG FILE INTO LOG GROUPS AT PREDETERMINED INTERVALS
S101
EXTRACT PATTERNS BY ANALYZING LOG GROUPS
S102
ANALYZE SERIES OF LOG RECORDS ASSOCIATED WITH PROCESS, BASED ON INCLUSION RELATIONSHIP OF PATTERNS
S103
EXTRACT NORMAL PATTERN
S104
OUTPUT NORMAL PATTERN
S105
END

LOG ANALYSIS SYSTEM, FAULT CAUSE ANALYSIS SYSTEM, LOG ANALYSIS METHOD, AND RECORDING MEDIUM WHICH STORES PROGRAM

This application is a National Stage Entry of PCT/JP2014/004275 filed on Aug. 21, 2014, which claims priority from Japanese Patent Application 2013-197416 filed on Sep. 24, 2013, the contents of all of which are incorporated herein by reference, in their entirety.

TECHNICAL FIELD

The present invention relates to a technology of analyzing a log output by an information processing system.

BACKGROUND ART

For management and maintenance of an information processing system, a person who is in charge of the management and maintenance (to be referred to as "administrator" below) needs to identify, when a fault occurs in the information processing system, a cause of the fault. A log output by the information processing system may become an important clue when the administrator identifies the cause of the fault. However, since a log output by the information processing system is huge, it is difficult for the administrator to analyze the entire log in detail.

For the above reason, to identify the cause of the fault, the administrator needs to identify a message indicating a direct or indirect cause of occurrence of the fault (referred to as "cause message" below) from the huge amount of log output by the information processing system. Then, the administrator analyzes, in detail, the identified cause message and the log around the cause message, and thereby identifies the cause of the fault.

PTL 1 discloses an example of a technology of detecting, from a log of a huge size output by an information processing system, a pattern of messages appearing at a frequency different from that in normal operation. The technology disclosed in PTL 1 extracts, from a log output by the information processing system in normal operation (referred to as "normal log" below), a typical pattern, such as a frequency at which messages appear in a normal log (referred to as "normal pattern" below). The technology disclosed in PTL 1 compares the normal pattern with a log output by the information processing system as an analysis target (referred to as "analysis-target log" below) and extracts the difference therebetween. As a result, the technology disclosed in PTL 1 is able to detect, from the analysis-target log, a message appearing at a frequency different from that in normal operation.

CITATION LIST

Patent Literature

[PTL 1] Japanese Patent No. 4944391

[PTL 2] Japanese Unexamined Patent Application Publication No. 2012-194604

[PTL 3] Japanese Unexamined Patent Application Publication No. 2012-168702

SUMMARY OF INVENTION

Technical Problem

PTL 1 does not disclose in detail how to extract a normal pattern from a normal log. To appropriately analyze a cause of a fault occurring in an information processing system, it is necessary to appropriately extract a normal pattern from a normal log.

A description is given of "appropriately extracting a normal pattern from a normal log". The "appropriately extracting a normal pattern from a normal log" means extracting, on the basis of a normal log, information indicating a process and a frequency at which the process is carried out in an information processing device.

When a process is carried out in an information processing device, the information processing device outputs a plurality of messages in predetermined time series in response to the process being carried out. In the following description, a plurality of messages output by the information processing device in predetermined time series in response to the information processing device carrying out a particular process are referred to as a "series of messages."

A normal log includes an enormous number of messages. To extract information indicating a process and a frequency at which the process has been carried out, on the basis of the normal log, "information for grouping a series of messages in units of process" is necessary.

PTL 2 and PTL 3 disclose technologies of analyzing a log on the basis of "information for grouping a series of messages in units of process."

The technology disclosed in PTL 2 uses a transaction identifier (ID) included in messages, as the "information for grouping a series of messages in units of process." The technology disclosed in PTL 2 groups, on the basis of a transaction ID included in messages, a plurality of messages including the same transaction ID as a series of messages related to a corresponding transaction.

The technology disclosed in PTL 3 uses information in which a series of messages related to a process is defined in advance, as the "information for grouping a series of messages in units of process." The technology disclosed in PTL 3 groups, on the basis of the information, a plurality of messages as a series of messages related to a specific process.

However, to appropriately extract a normal pattern from a normal log, the "information for grouping a series of messages in units of process" is not always provided in advance. It is conceivable that, in the technology disclosed in PTL 2, a transaction ID may not be assigned to messages.

One of the aims of the present invention is to appropriately extract or assist in extracting a normal pattern from a normal log without any information being provided in advance for grouping a series of messages in units of process.

Solution to Problem

A first aspect of the present invention is a log analysis system including: division means for dividing a log file including information in which log records are aligned in time series, in accordance with a predetermined rule, into log groups each of which corresponds to a set of log records being contiguous in time series, each of the log records corresponding to information in which an event is associated with a time point of occurrence of the event; extraction means for extracting patterns each of which is formed with events being contiguous in time series, from the log groups, and associating the patterns with frequency information indicating numbers of log records from which the patterns are extracted; and selection means for selecting a pattern to be output, from the patterns, on a basis of an inclusion relationship between events with which a pattern is formed and being contiguous in time series and events with which another pattern is formed and being contiguous in time series, and on a basis of frequency information associated with the patterns.

A second aspect of the present invention is a log analysis method by a computer including: dividing a log file including information in which log records are aligned in time series, in accordance with a predetermined rule, into a log groups each of which corresponds to a set of log records being contiguous in time series, each of the log records corresponding to information in which an event is associated with a time point of occurrence of the event; extracting patterns each of which is formed with events being contiguous in time series, from the log groups, and associates the patterns with frequency information indicating numbers of log records from which the patterns are extracted; and selects a pattern to be output, from the patterns on a basis of an inclusion relationship between events with which a pattern is formed and being contiguous in time series and events with which another pattern is formed and being contiguous in time series, and on a basis of frequency information associated with the patterns.

A third aspect of the present invention is a recording medium that stores a program causing a computer to execute: processing of dividing a log file including information in which log records are aligned in time series, in accordance with a predetermined rule, into log groups each of which corresponds to a set of log records being contiguous in time series, each of log records corresponding to information in which an event is associated with a time point of occurrence of the event; processing of extracting patterns each of which is formed with events being contiguous in time series, from the log groups, and associating the patterns with frequency information indicating numbers of log records from which the patterns are extracted; and processing of selecting a pattern to be output, from the patterns on a basis of an inclusion relationship between events with which a pattern is formed and being contiguous in time series and events with which another pattern is formed being contiguous in time series, and on a basis of frequency information associated with the patterns.

The aim of the present invention is achieved by the above-described computer-readable recording medium in which the program is stored and also by the program stored in the recording medium.

Advantageous Effects of Invention

According to the present invention, it is possible to appropriately extract, or assist in extracting, a normal operation pattern from a normal log without any information being provided in advance for grouping a series of messages in units of process.

BRIEF DESCRIPTION OF DRAWINGS

FIG. 2 is a table presenting an example of a normal log 910 input to the log analysis system 100 according to the first exemplary embodiment of the present invention.

FIG. 4 is a table presenting an example of a log file divided by a division unit 110 according to the first exemplary embodiment of the present invention.

FIG. 5 is a table presenting an example of patterns extracted by an extraction unit 120 according to the first exemplary embodiment of the present invention.

FIG. 7 is a table presenting the operation of the selection unit 130 according to the first exemplary embodiment of the present invention.

FIG. 11A is a first drawing presenting an example of a log file input to a conversion unit 150 according to the second exemplary embodiment of the present invention.

FIG. 11B is a second drawing presenting an example of the log file input to the conversion unit 150 according to the second exemplary embodiment of the present invention.

FIG. 11C is a third drawing presenting an example of the log file input to the conversion unit 150 according to the second exemplary embodiment of the present invention.

FIG. 12 is a diagram presenting an example of a format according to the second exemplary embodiment of the present invention.

FIG. 13 is a diagram presenting an example of the format according to the second exemplary embodiment of the present invention.

DESCRIPTION OF EMBODIMENTS

Exemplary embodiments of the present invention are described below in detail with reference to the drawings.

First Exemplary Embodiment

Figure 1:
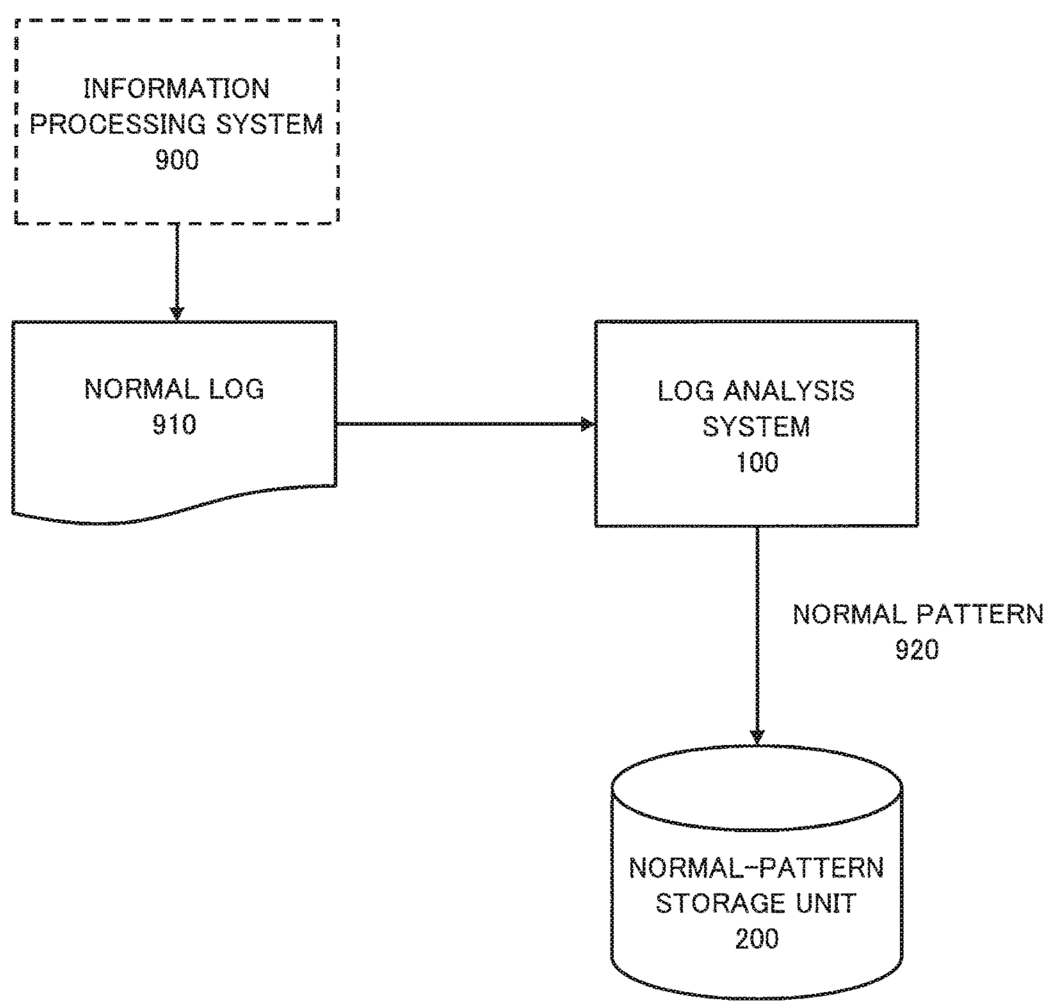
FIG. 1 is a block diagram illustrating a log analysis system 100 according to a first exemplary embodiment of the present invention.

FIG. 1 is a block diagram illustrating a log analysis system 100 according to a first exemplary embodiment of the present invention. As illustrated in FIG. 1, the log analysis system 100 acquires a normal log 910 output by an information processing system 900. As described above, the normal log 910 is a log output by the information processing system 900 when the information processing system 900 is operating normally. The log analysis system 100 extracts information indicating a process and a frequency at which the process has been carried out in the information processing system 900, that is, a normal pattern 920, on the basis of the normal log 910. As will be described later, it is not necessary that a concrete process is identified on the basis of the normal pattern 920. The log analysis system 100 outputs the normal pattern 920 to a normal-pattern storage unit 200. In the following description the "information processing system 900" is an information processing device which outputs the normal log 910 acquired by the log analysis system 100 according to the present exemplary embodiment and the log analysis systems according to other exemplary embodiments of the present invention. The "information processing system 900" is also an information processing device which outputs an analysis-target log 990 acquired by a fault cause analysis system 300 according to another exemplary embodiment of the present invention.

FIG. 2 is a table illustrating an example of the normal log 910 output by the information processing system 900. The normal log 910 is also called a log file. The normal log 910 includes information in which a plurality of log records are aligned in time series.

A log record is information in which an event occurred in the information processing system 900 is associated with the time point at which the event occurred. A log record is also called a message. A log record is information corresponding to a "row" presented in FIG. 2. The log record presented in the first row in FIG. 2 indicates that an event identified by an event ID (identifier) "A" occurred at the time point 09:04:01 in the information processing system 900. The log record presented in the second row in FIG. 2 indicates that an event identified by an event ID (identifier) "B" occurred at the time point 09:04:02 in the information processing system 900. An event ID is an identifier which identifies an event that occurred in the information processing system 900.

In the following description of the exemplary embodiment, an event is identified by use of an event ID when the event needs to be identified. In addition, hereinafter, a "log record indicating that the event A occurred at a certain time point", for example, may be expressed as a "log record of the event A" in some cases.

When the information processing system 900 carries out a process, the information processing system 900 generates a plurality of events in predetermined time series in response to the process being carried out. In the following description, a plurality of events generated by the information processing system 900 in predetermined time series in response to the information processing system 900 carrying out a specific process are referred to as a "series of events".

For easy understanding, the present exemplary embodiment is described with the following concrete assumptions. It is assumed that, when the information processing system 900 carries out (Process 1), the information processing system 900 generates Event A, Event B, and Event C in this order. It is assumed that, when the information processing system 900 carries out (Process 2), the information processing system 900 generates Event X and Event Y in this order.

Under the above assumptions, when the information processing system 900 carries out (Process 1), the information processing system 900 outputs the log record of Event A, the log record of Event B, and the log record of Event C in this order. When the information processing system 900 carries out (Process 2), the information processing system 900 outputs the log record of Event X and the log record of Event Y in this order.

The normal log 910 includes an enormous number of log records. The log analysis system 100 extracts information indicating a process and a frequency at which the process has been carried out, on the basis of the normal log 910. For example, the log analysis system 100 extracts, as the normal pattern 920, information indicating "Process 1 has been carried out 10 times, and Process 2 has been carried out 18 times, in a predetermined time period". It is not necessary that a concrete process is identified on the basis of the normal pattern 920. For example, the normal pattern 920 may be information indicating that "the pattern of Events A→B→C has occurred 10 times, and the pattern of Events X→Y has occurred 18 times, in the predetermined time period". The normal pattern 920 providing such information can sufficiently play a role as a comparison target to be used for analyzing the cause of a fault which occurred in the information processing system 900.

The symbol "→" denotes that the events described before and after the symbol are contiguous in time series in the normal log 910. Specifically, "A→B→C→" means that the log record of Event A, the log record of Event B, and the log record of Event C are contiguous in this order in the normal log 910. In some parts of the following description, "A→B→C", for example, is denoted as "ABC" by omitting the symbol "→", to express a plurality of events being contiguously occurred.

In order for the log analysis system 100 to extract such information on the basis of the normal log 910, "information for grouping a series of log records in units of process" is needed.

Here, the "information for grouping a series of log records in units of process" is, for example, information indicating "the log record of Event A, the log record of Event B, and the log record of Event C are associated with a certain process" or "the log record of Event X and the log record of Event Y are associated with a certain process".

The log analysis system 100 according to the present exemplary embodiment is capable of appropriately extracting the normal pattern 920 on the basis of the normal log 910 without any "information for grouping a series of log records in units of process" being explicitly provided in advance. This is because the log analysis system 100 according to the present exemplary embodiment itself can extract "information for grouping a series of log records in units of process" on the basis of the normal log 910.

In other words, even when the log analysis system 100 is not provided in advance with information indicating "the log record of Event A, the log record of Event B, and the log record of Event C are associated with a certain process" or "the log record of Event X and the log record of Event Y are associated with a certain process", the log analysis system 100 itself can extract such information on the basis of the normal log 910.

It is assumed that the information processing system 900 according to the present exemplary embodiment has the following attributes as assumptions.

(Assumption 1) The information processing system 900 carries out a plurality of processes in parallel.

(Assumption 2) For example, when the information processing system 900 carries out Process 1 and Process 2 in parallel, the information processing system 900 may output a log file in which the log records of the events associated with Process 1 and the log records associated with Process 2 are mixed in time series, in some cases. For example, the log records output in the time period from 09:04:12 to 09:04:16 in FIG. 2 include the log records of the events associated with Process 1 and the log records of the events associated with Process 2 being mixed in time series. In the example illustrated in FIG. 2, Events A→B→C are associated with Process 1. Similarly, Events X→Y are associated with Process 2.

(Assumption 3) It is not often that the log records of events associated with a certain process are output in such a manner as to be mixed in time series with the log records of events associated with a different process as described above. In most cases, the log records of events associated with a particular process is contiguous in time series in a log file.

Detailed description is given below of how the log analysis system 100 appropriately extracts the normal pattern 920 from the normal log 910, on the basis of the above assumptions.

Figure 3:
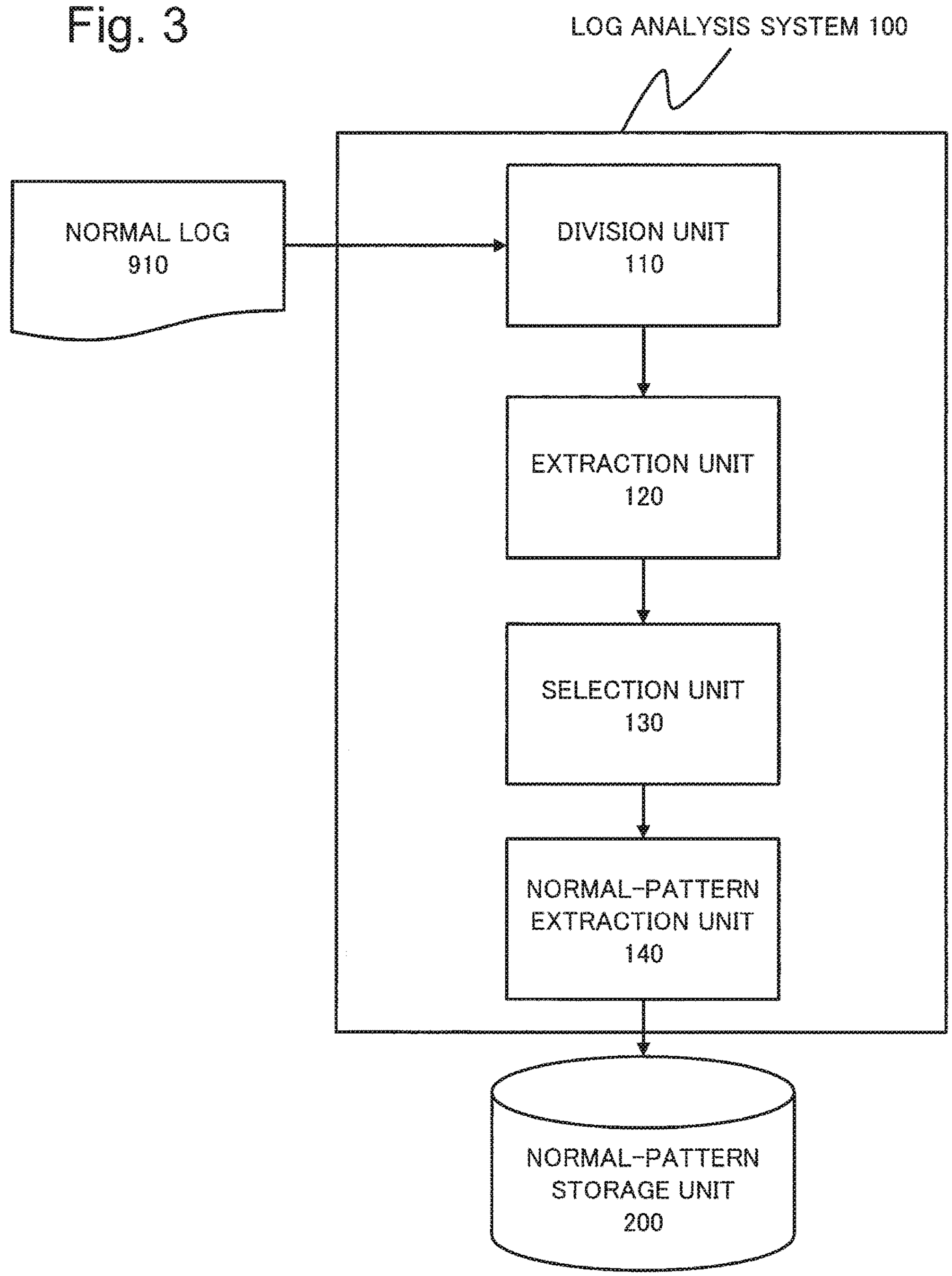
FIG. 3 is a block diagram illustrating a configuration of the log analysis system 100 according to the first exemplary embodiment of the present invention.

FIG. 3 is a block diagram illustrating the log analysis system 100 illustrated in FIG. 1. As illustrated in FIG. 3, the log analysis system 100 includes a division unit 110, an extraction unit 120, a selection unit 130, and a normal-pattern extraction unit 140.

The division unit 110 acquires the normal log 910 and divides the acquired normal log 910 into a plurality of log groups. Each log group is a set of a plurality of log records which are contiguous in time series (to be described later in detail).

The extraction unit 120 extracts, from a plurality of log groups, a plurality of "patterns" each of which is formed with a plurality of events which are contiguous in time series. The extraction unit 120 associates a pattern in the patterns with frequency information which indicates the number of log records from which the pattern is extracted (to be described later in detail).

The selection unit 130 selects a pattern to be output from the plurality of patterns, on the basis of an inclusion relationship between a plurality of events which are contiguous in time series and with which a certain pattern is formed and a plurality of events which are contiguous in time series and with which a different pattern is formed. In addition, the selection unit 130 selects a pattern to be output from the plurality of patterns, on the basis of the frequency information associated with the patterns (to be described later in detail).

The normal-pattern extraction unit 140 extracts the normal pattern 920 from the normal log 910 on the basis of the pattern output by the selection unit 130.

The division unit 110 is described in detail. FIG. 4 is a table illustrating a state in which the normal log 910 presented in FIG. 2 is divided into a plurality of log groups by the division unit 110. The log groups presented in FIG. 4 are obtained in a case where the division unit 110 divides the normal log 910 into log groups at five-second intervals.

The division unit 110 divides the normal log 910 at predetermined time intervals specified in advance. Preferably, the division unit 110 divides the normal log 910 at time intervals with which log records of a series of events, which are output in response to a process carried out by the information processing system 900, are expected to be included in a single log group. The time period required for the information processing system 900 to carry out a particular process varies every time depending such as on the load state of the information processing system 900. Accordingly, it is preferable that the division unit 110, for example, calculates a value such as the average processing time and determines the time intervals for division on the basis of such a value.

For the determination of the time interval for the division, values of Poisson distribution or the like of execution time of the process or transaction may be taken into account.

The extraction unit 120 is described in detail. FIG. 5 is a table presenting an example of the "pattern" extracted from a plurality of log groups by the extraction unit 120 and the "frequency" of the pattern that is extracted. The "pattern" is the combination of a plurality of events being contiguous in time series, which are found in the log groups. The "frequency" is information indicating the number of log records from which the concerned pattern is extracted.

Description is given with concrete examples. For example, assume a case where the extraction unit 120 extracts a pattern from Log group 1 illustrated in FIG. 4. The plurality of log records which are contiguous in time series and with which Log Group 1 is formed are "ABCXY". In this case, possible patterns which the extraction unit 120 extracts from Log Group 1 are as follows: "ABCXY", "ABCX", "BCXY", "ABC", "BCX", "CXY", "AB", "BC", "CX", "XY", "A", "B", "C", "X", and "Y."

The extraction unit 120 extracts the "pattern" from a plurality of log groups. The extraction unit 120 associates the pattern with frequency information indicating the number of log records from which the pattern is extracted. For example, in FIG. 5, the frequency of the pattern "ABC" is 43. This means that the pattern "ABC" is extracted from 43 log groups.

Various algorithms can be used as a concrete method of extracting patterns. The extraction unit 120 extracts patterns by use of, for example, one of apriori, prefixspan, Linear time Closed itemset Miner (LCM), Bi-Directional Execution (BIDE), and Frequent Pattern (FP)-growth, or an application of one of those algorithms.

In the following description, a pattern which is associated with a specific process carried out by the information processing system 900 is referred to as a "meaningful pattern". For example, the pattern "ABC" is associated with Process 1 and is hence a meaningful pattern. For example, the pattern "XY" is associated with Process 2 and is hence a meaningful pattern.

In the following description, a pattern which is not associated with any specific process carried out by the information processing system 900 is referred to as a "meaningless pattern". A type of a meaningless pattern is, for example, a pattern which is merely a subset of a meaningful pattern. For example, a pattern such as "AB" or "BC" itself is not associated with any process independently and is hence a meaningless pattern. Another type of a meaningless pattern is, for example, a pattern made by adding an event to a meaningful pattern. For example, a pattern such as "ABCX" or "XYA" itself is not associated with any process independently and is hence a meaningless pattern. Still another type of a meaningless pattern is, for example, a pattern in which a pattern associated with a process is mixed with a pattern associated with another process are mixed in time series. For example, a pattern such as "ABXCY" or "XAYBC" itself is not associated with any process independently and is hence a meaningless pattern.

The selection unit 130 is described in detail. The selection unit 130 selects a "meaningful pattern" from the plurality of patterns extracted by the extraction unit 120 and outputs the selected pattern as "information for grouping a series of messages in units of process".

In view of the above-described (Assumption 3), it is not so often to find a pattern in which a pattern associated with a process and a pattern associated with another process are mixed in time series. For this reason, the selection unit 130 can remove such a pattern as noise by avoiding selecting any pattern whose frequency is lower than a predetermined threshold value.

Similarly, in view of the above-described (Assumption 3), it is conceivable that the frequency of the pattern "ABC" or "XY", which is associated with a specific process carried out by the information processing system 900, is higher than the frequencies of other patterns. However, when the frequency of, for example, the pattern "ABC" is high, naturally, the frequencies of the patterns "AB" and "BC", which are subsets of the pattern "ABC", are also high. And, it is possible that the frequency of a pattern such as "ABCX" or "YABC", which is made by adding an event to the pattern "ABC", is also high to some extent. Therefore, the selection unit 130 does not select "meaningful patterns" only by simply selecting patterns with high frequencies.

This is because, when the selection unit 130 simply extracts patterns with high frequencies, a "meaningful pattern", a "pattern of a subset of a meaningful pattern", and a "pattern made by adding an event to a meaningful pattern" are extracted without any distinction. It is not possible for the selection unit 130 to distinctively select a "meaningful pattern" from the above patterns.

The selection unit 130 selects a "meaningful pattern" from the plurality of patterns through the following operation. The operation of the selection unit 130 is described below specifically.

The selection unit 130 selects a pattern to output, from the plurality of patterns, on the basis of inclusion relationship between the plurality of events which are contiguous in time series and with which a pattern is formed and the plurality of events which are contiguous in time series and with which another pattern is formed. The selection unit 130 selects a pattern to output, from the plurality of patterns, further on the basis of frequency information associated with the patterns.

For easy understanding, terms "parent pattern" and "child pattern" are defined below. When a plurality of events which are contiguous in time series and with which one pattern is formed corresponds to a subset of a plurality of events which are contiguous in time series and with which another pattern is formed, the another pattern is defined as a parent pattern of the one pattern. The one pattern is defined as a child pattern of the another pattern. For example, the pattern "ABCD" is a parent pattern of the pattern "ABC". For example, the pattern "AB" is a child pattern of the pattern "ABC". A term such as "grandchild pattern" can be defined similarly.

Figure 6:
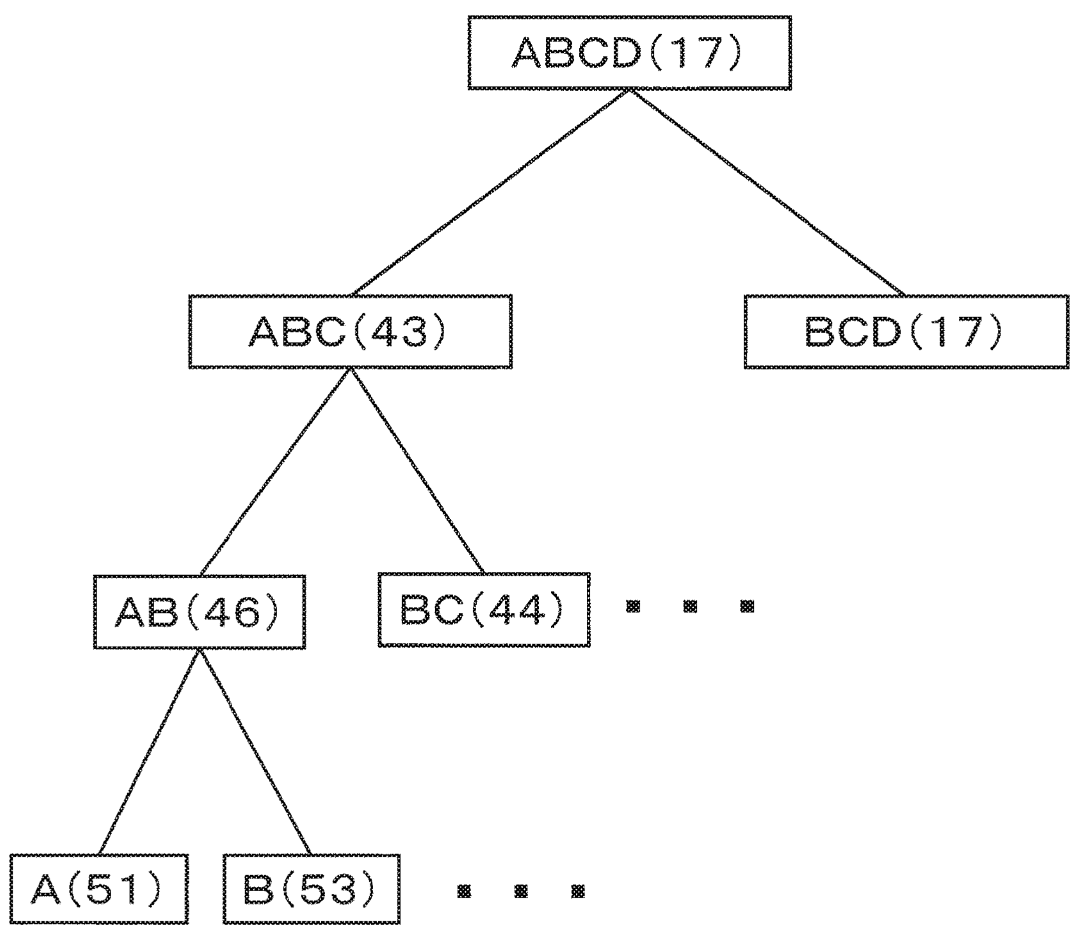
FIG. 6 is a diagram illustrating operation of a selection unit 130 according to the first exemplary embodiment of the present invention.

The selection unit 130 analyzes the parent-child relationship for each of the patterns extracted by the extraction unit 120. FIG. 6 is a diagram presenting a state in which the selection unit 130 analyzes the parent-child relationship for the pattern "ABCD". As illustrated in FIG. 6, the selection unit 130 puts the patterns including events in common order together in the same category set. Then, the selection unit 130 analyzes the parent-child relationship of the patterns on the basis of the numbers of events (the numbers of elements) included in the patterns.

Concrete Example 1 to Concrete Example 4 are described below as examples of the operation of the selection unit 130. The selection unit 130 extracts a "meaningful pattern" by, for example, a combination of the following concrete examples.

Concrete Example 1

The selection unit 130 analyzes the parent-child relationship for each of the plurality of patterns. As a result of the analysis by the selection unit 130, the parent-child relationship indicating that the parent pattern is "ABCX", the child pattern is "ABC", and the grandchild pattern is "AB", or the like is obtained for the pattern "ABCX", for example.

The selection unit 130 calculates the ratio of a frequency of a child pattern to a frequency of a parent pattern. In the example presented in FIG. 5, the frequency of the parent pattern "ABCX" is 17, and the frequency of the child pattern "ABC" is 43; accordingly, the ratio between the frequencies is 43/17=2.5. Here "/" is a symbol representing division. When the ratio is a relatively large value (e.g., a case where the value is 2 or larger), there is a high possibility that the parent pattern is a "meaningless pattern". This is because it is considered that such a parent pattern is a pattern of the child pattern to which an event is simply added.

Similarly, the selection unit 130 calculates the ratio of a frequency of a child pattern to a frequency of a parent pattern. In the example presented in FIG. 5, the frequency of the parent pattern "ABC" is 43, and the frequency of the child pattern "AB" is 46. Accordingly, the ratio between the frequencies is 46/43=1.07. When the ratio is a value close to one (e.g., a case where the value is 1.1 or smaller), there is a high possibility that the child pattern is a "meaningless pattern". This is because such a child pattern is merely extracted as a subset of a parent pattern in most cases and it is difficult to consider that such a child pattern is associated with a certain process independently. A conceivable example of a case where such a child pattern is extracted as a pattern other than a subset of the parent pattern is a case where the division unit 110 accidentally divides the normal log 910 at the middle of a "meaningful pattern", such as, at the division between Log Group 2 and Log Group 3 presented in FIG. 4.

Concrete Example 2

The selection unit 130 analyzes the parent-child relationship for each of the plurality of patterns. The selection unit 130 may preferentially select, as a "meaningful pattern", a pattern which is formed with a large number of elements (events) and the frequency of which is high. For example, the pattern "ABC" may be preferentially selected as a "meaningful pattern" since the pattern "ABC" is formed with three elements (A, B, and C) and has a high frequency of 43. The criterion for determining whether the number of elements with which a pattern is formed is large or small and the criterion for determining whether a frequency is high or low may be set in advance, for example.

Concrete Example 3

The selection unit 130 analyzes the parent-child relationship for each of the plurality of patterns. FIG. 7 is a table obtained by analyzing, for each pattern, the number of parent patterns of a pattern. The selection unit 130 may preferentially select a child pattern having more parent patterns as a "meaningful pattern".

Concrete Example 4

The selection unit 130 analyzes the parent-child relationship for each of the plurality of patterns. The selection unit 130 may select a "meaningful pattern" on the basis of, for example, a support degree of pattern, a reliability degree of a parent pattern with respect to a child pattern, the ratio of the reliability degree to the support degree (a lift value), or the like. The support degree, the reliability degree, and the lift value may be defined by an operator in advance, for example.

Concrete Example 5

The selection unit 130 may preferentially select a child pattern which is consistent with the concerned pattern, when, for example, the pattern "XYABC" is extracted. For example, in the above-described example, the child patterns "ABC" and "XY" is consistent with the parent pattern "ABCXY" and are hence preferentially selected. For example, in the above-described example, child patterns "XAB" and "XBC" are not consistent with the parent pattern "ABCXY" (e.g., YC is too much in a case of XAB) and is hence excluded from candidates.

(Concrete Example 1), (Concrete Example 2), (Concrete Example 3), (Concrete Example 4), and (Concrete Example 5) are described above as examples of the operation of the selection unit 130. The selection unit 130 selects the patterns "ABC" and "XY" as "meaningful patterns" from among the patterns extracted by the extraction unit 120, through the operation provided as the above-described concrete examples. The selection unit 130 outputs the selected patterns to the normal-pattern extraction unit 140.

The normal-pattern extraction unit 140 receives an input of a "meaningful pattern" from the selection unit 130. The normal-pattern extraction unit 140 extracts the normal pattern 920 from the normal log 910 on the basis of the received pattern.

Figure 8:
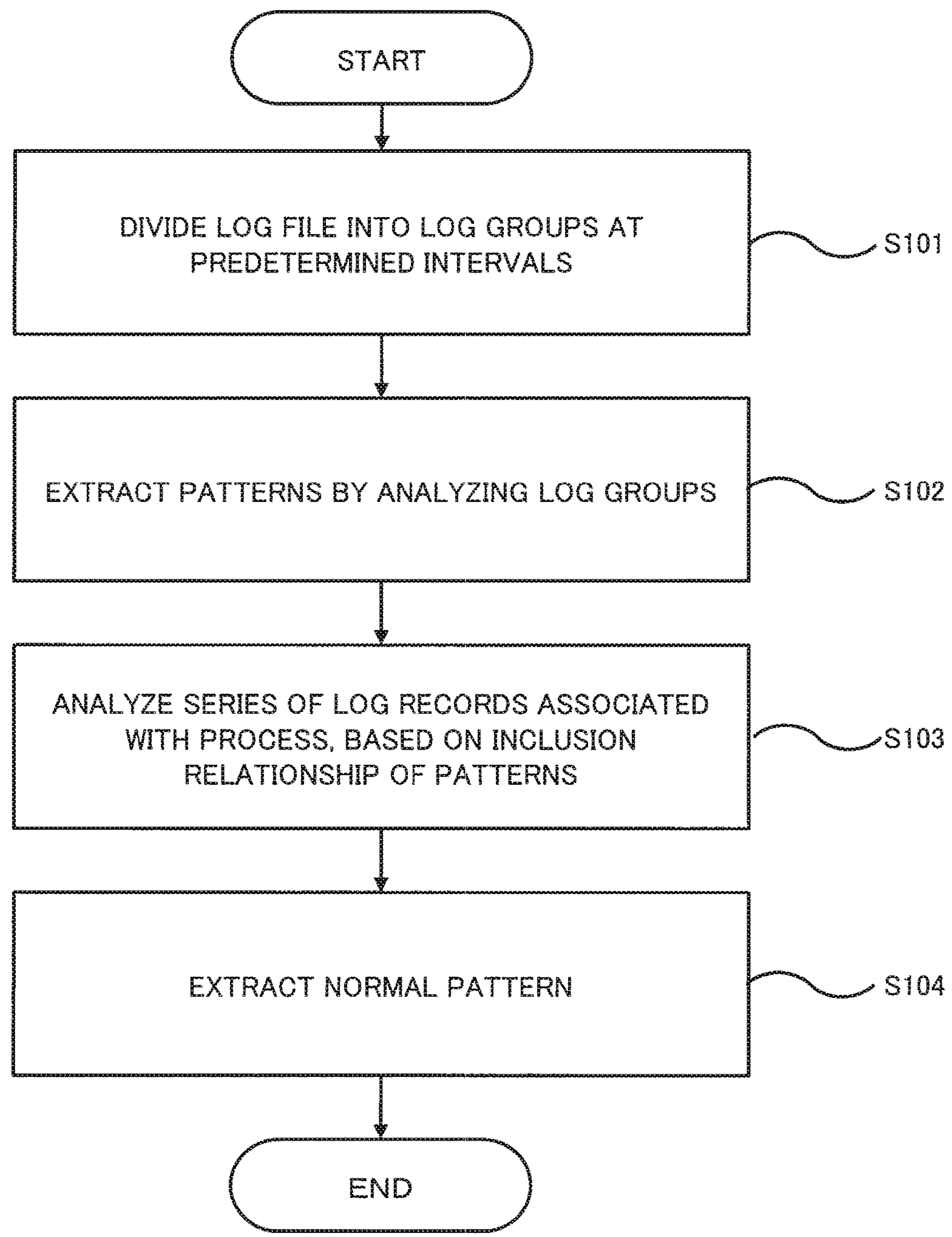
FIG. 8 is a flowchart illustrating operation of the log analysis system 100 according to the first exemplary embodiment of the present invention.

Next, operation of the log analysis system 100 is described. FIG. 8 is a flowchart presenting the operation of the log analysis system 100 according to the first exemplary embodiment.

The division unit 110 divides the normal log 910 (log file) into a plurality of log groups (Step S101). The extraction unit 120 extracts patterns from the plurality of log groups (Step S102). The selection unit 130 selects a "meaningful pattern" from the patterns extracted by the extraction unit 120 and outputs the selected "meaningful pattern". (Step S103). The normal-pattern extraction unit 140 extracts the normal pattern 920 from the normal log 910 on the basis of the pattern selected by the selection unit 130 (Step S104).

Figure 9:
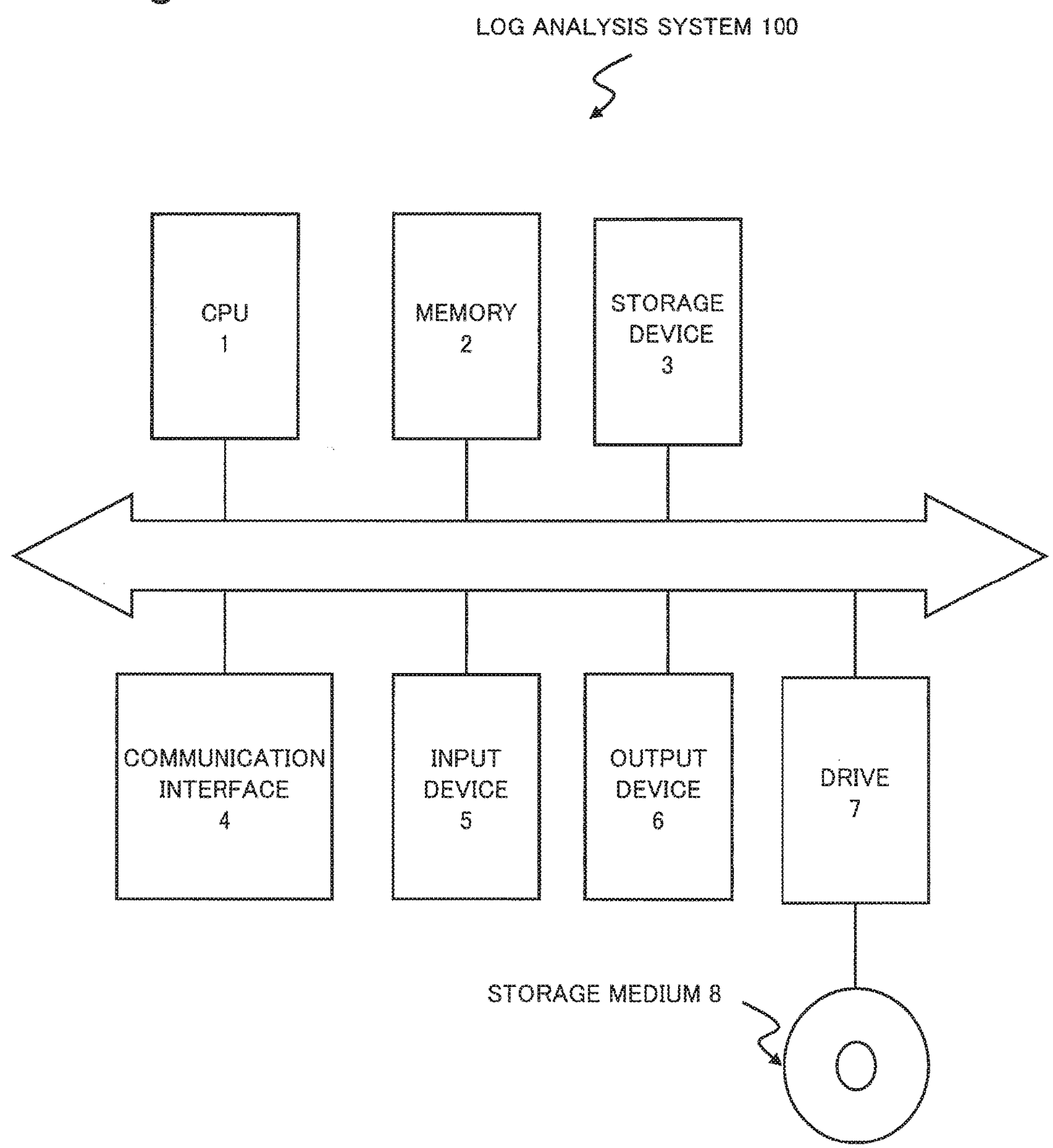
FIG. 9 is a diagram presenting an example of a hardware configuration with which the log analysis system 100 is implemented.

Next, an example of a hardware configuration with which the log analysis system 100 can be implemented is described. FIG. 9 is a diagram illustrating an example of the hardware configuration with which the log analysis system 100 can be implemented.

The log analysis system 100 of the present exemplary embodiment and the log analysis systems according to the other exemplary embodiments can be implemented by a computer having the hardware configuration presented in FIG. 9. The computer includes a CPU (central processing unit) 1, a memory 2, a storage device 3, and a communication interface (I/F) 4. The log analysis system may include an input device 5 or an output device 6. Functions of the log analysis system are implemented by, for example, the CPU 1 executing a computer program (a software program, which is referred to simply as a "program" below) loaded into the memory 2. At the time of execution, the CPU 1 appropriately controls the communication interface 4, the input device 5, and the output device 6.

Note that the present invention described by taking, as examples, the present exemplary embodiment and the exemplary embodiments to be described later may be implemented by a nonvolatile storage medium 8, such as a compact disc, in which a concerned program are stored. The program stored in the storage medium 8 is read out by, for example, the drive 7.

Communication performed by the log analysis system is achieved by an application program controlling the communication interface 4 by use of a function provided by, for example, an OS (operating system), for example. The input device 5 is, for example, a keyboard, a mouse, or a touch panel. The output device 6 is, for example, a display. The log analysis system may be implemented with two or more physically separated devices being communicably connected by wire or wirelessly. The hardware configuration of the log analysis system and the functional blocks of the log analysis system are not limited to the above-described configuration. The above-described hardware configuration is also applicable to the log analysis system and the fault cause analysis system according to the other exemplary embodiments to be described later.

The effects of the log analysis system 100 according to the first exemplary embodiment are described. The log analysis system 100 is capable of appropriately extracting, or assisting in extracting, the normal pattern 920 from the normal log 910 without "information for grouping a series of messages in units of process" being provided in advance. This is because the log analysis system 100 can extract for itself "information for grouping a series of messages in units of process" on the basis of the normal log 910.

Modified Example of First Exemplary Embodiment

The division unit 110, the extraction unit 120, the selection unit 130, and the normal-pattern extraction unit 140 each may start the operation, for example, upon receipt of an instruction of a pattern generation start by a user, or another program, software or the like from an unillustrated input device. The division unit 110, the extraction unit 120, the selection unit 130, and the normal-pattern extraction unit 140 each may start the operation, for example, upon an input, an update or the like of a log file.

The division unit 110 may divide a log file so that a single log group is formed with a predetermined number of log records. For example, the division unit 110 may divide a log file so that a single log group is formed with five log records. The division unit 110 may acquire log files at predetermined time intervals. The division unit 110 may operate in such a way as to acquire log files of five minutes at intervals of five minutes, or to acquire log files of five minutes at intervals of three minutes, for example.

The extraction unit 120 may extract, as a pattern, events which are not contiguous in time series. For example, the extraction unit 120 may extract the patterns "ABXY", "ACY", or "BCY" from the log group 1 "ABCXY".

The selection unit 130 may analyze the parent-child relationship on the basis of events which are not contiguous in time series. For example, the selection unit 130 may associate a pattern such as "AC" or "ACX" as a child pattern with the parent pattern "ABCX".

Second Exemplary Embodiment

Figure 10:
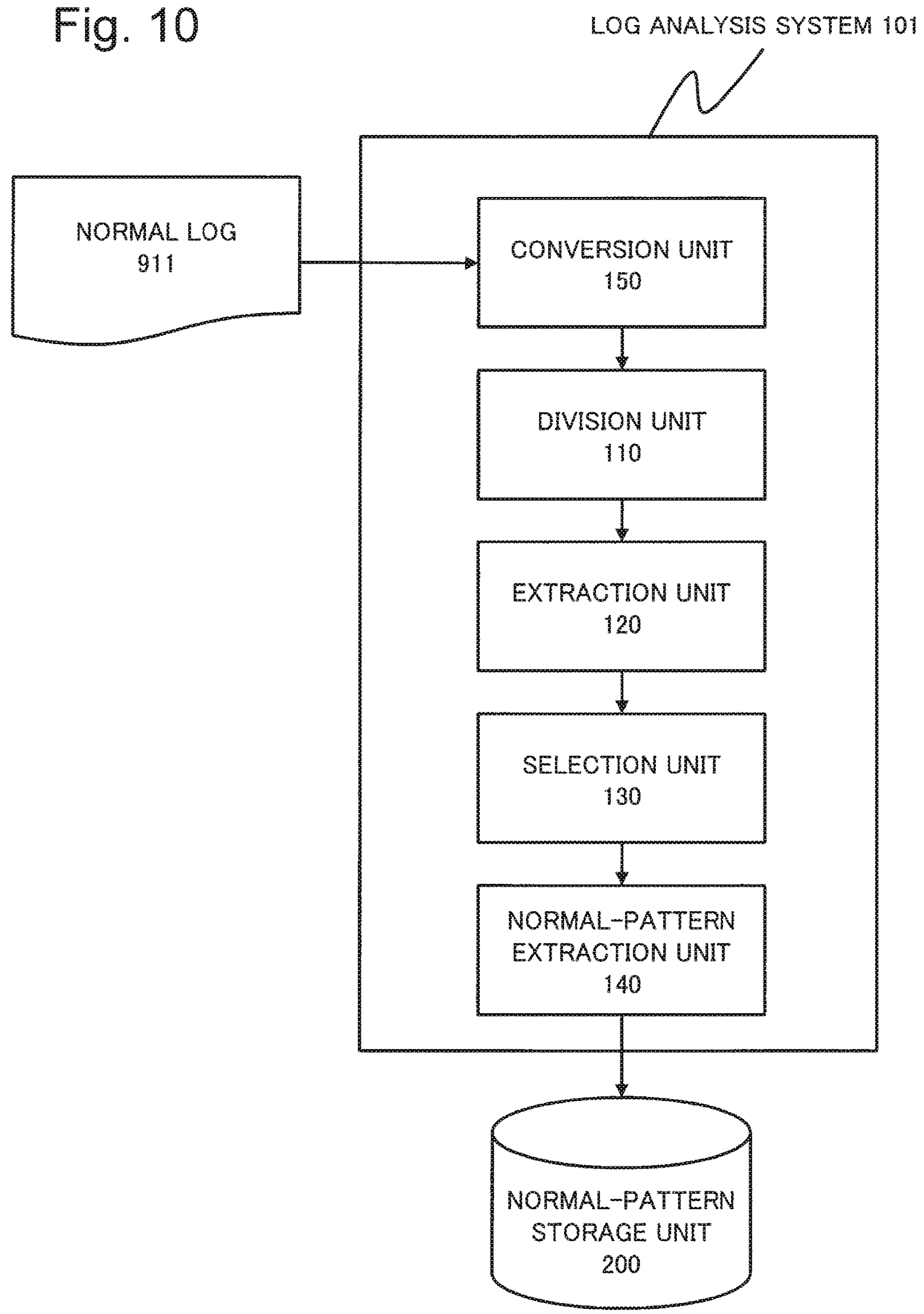
FIG. 10 is a block diagram illustrating a configuration of a log analysis system 101 according to a second exemplary embodiment of the present invention.

FIG. 10 is a block diagram illustrating a configuration of a log analysis system 101 according to a second exemplary embodiment of the present invention. Components which are substantially the same as those illustrated in FIG. 3 are denoted by the same reference signs, and description thereof is omitted. A log analysis system 101 according to the second exemplary embodiment further includes a conversion unit 150 in addition to the log analysis system 100 according to the first exemplary embodiment.

In the normal log 910 to be received by the log analysis system 100 in the first exemplary embodiment, event IDs are already assigned to the respective log records as illustrated in FIG. 2. In the second exemplary embodiment, a normal log 911 received by the log analysis system 101 is a log file which is closer to raw data. The conversion unit 150 receives a log file, for example, as that presented in FIG. 11A, FIG. 11B, or FIG. 11C, and converts the received log file into a log as that illustrated in FIG. 2.

Each of FIG. 11A, FIG. 11B, and FIG. 11C is a drawing presenting an example of the normal log 911 (log file) received by the conversion unit 150. The log file is formed with at least one log record. The log record is formed so as to include at least one log element. A log element is an element, such as, time and date, a log ID (identifier), or a message, with which a log record is formed.

The conversion unit 150 converts the normal log 911 in accordance with a format defined by an operator in advance. FIG. 12 is a diagram presenting an example of the format defined by the operator in advance. The format presented in FIG. 12 specifies the period "2013/07/01 09:00:00-2013/07/01 18:00:00" and specifies the log elements "time and date" and "log ID". Information, such as a regular expression for each log element, by which the log element to be extracted can be identified, may be recorded in the format to extract a log element from a log file. Information, such as a name of a log file as a target, by which a log file can be identified, may be recorded in the format. A structure of a log record, which is formed with log elements, may be recorded as a regular expression in the format.

FIG. 13 is a diagram presenting another example of the format defined by an operator in advance. FIG. 13 presents information associating an event ID and an expression (record expression) of the event to which the event ID is to be assigned. A record expression is a character string representing a concerned log record. As a record expression, a log record may be recorded as it is. Information of an extracted log element of a log record may be recorded as a record expression. A regular expression matching a log record may be recorded as a record expression.

Upon receipt of an input of the normal log 911 as that presented in FIG. 11A, FIG. 11B, or FIG. 11C, the conversion unit 150 converts the normal log 911 into a log file as that presented in FIG. 2, on the basis of the format presented in FIG. 12 or FIG. 13. The conversion unit 150 may read, for example, a log of the period specified in the log format from the information processing system 900. There may be two or more log files as a target to be read. The conversion unit 150 extracts a log element specified by the format from the log file which is acquired or read. For example, in the case of the format presented in FIG. 12, the conversion unit 150 extracts only the time and date and the log ID from log records included in a log file. The conversion unit 150 sorts the converted log in time series, and outputs the log. Through these operations, the division unit 110, the extraction unit 120, the selection unit 130, and the normal-pattern extraction unit 140 can process the normal log 911.

Figure 14:
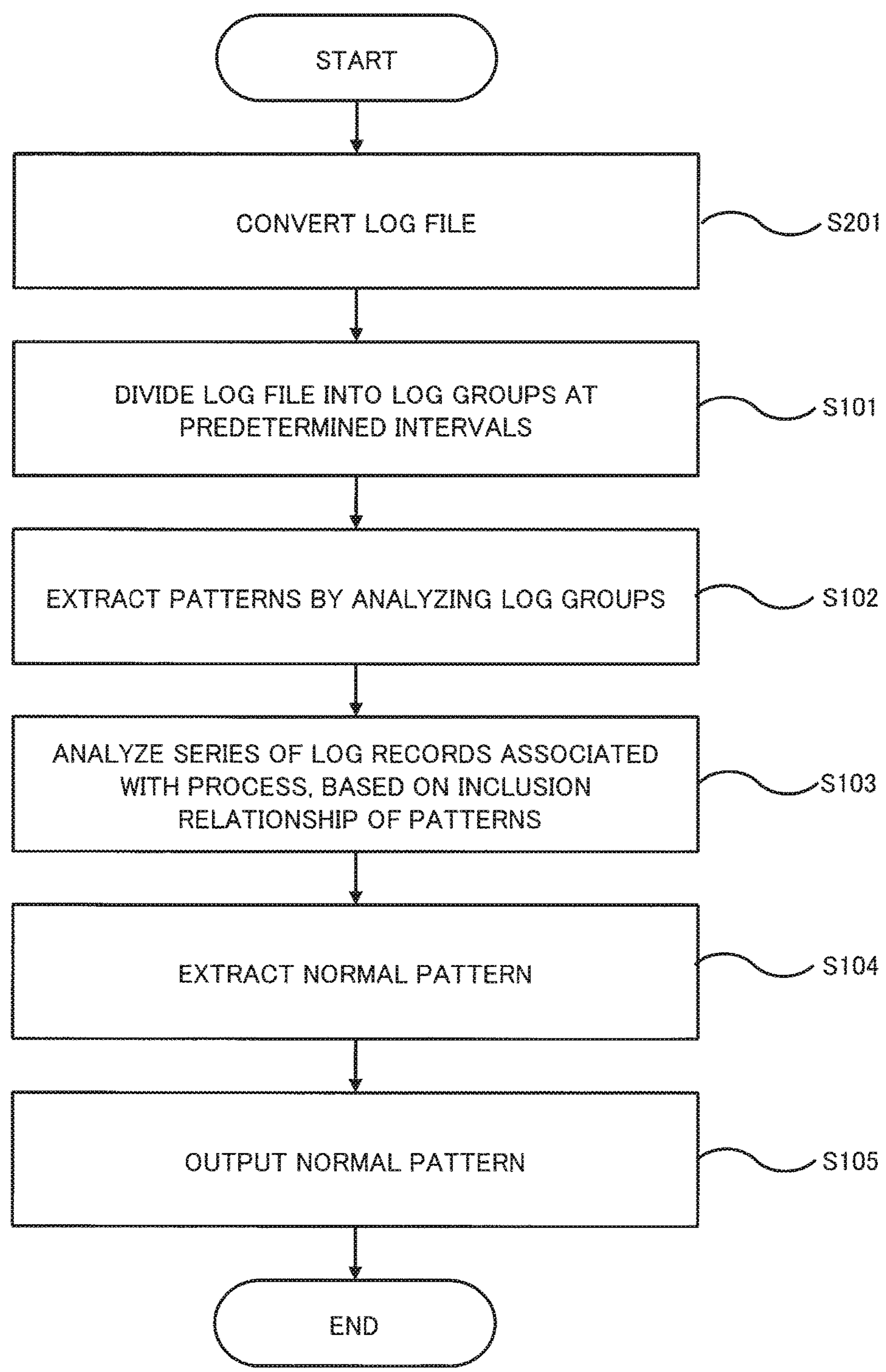
FIG. 14 is a flowchart illustrating operation of the log analysis system 101 according to the second exemplary embodiment of the present invention.

FIG. 14 is a flowchart illustrating operation of the log analysis system 101 according to the second exemplary embodiment. The same reference signs are assign to the steps in which the same operations are performed as those illustrated in FIG. 8, and the description of the steps is omitted.

The conversion unit 150 receives the log file 911 and converts the received log file so that event IDs are assigned to the respective log records (Step S201). The division unit 110 receives the converted log file from the conversion unit 150. The subsequent operations are the same as those presented in Step S101 to Step S104 in FIG. 3, and hence the description of the operations is omitted.

The effects of the log analysis system 101 according to the second exemplary embodiment are described. The log analysis system 101 includes the conversion unit 150. The conversion unit 150 converts logs output by the information processing system 900 into a form which can be processed by the division unit 110, the extraction unit 120, the selection unit 130, and the normal-pattern extraction unit 140. As a result of these operations, the log analysis system 101 can process normal logs 911 output in various formats.

Third Exemplary Embodiment

Figure 15:
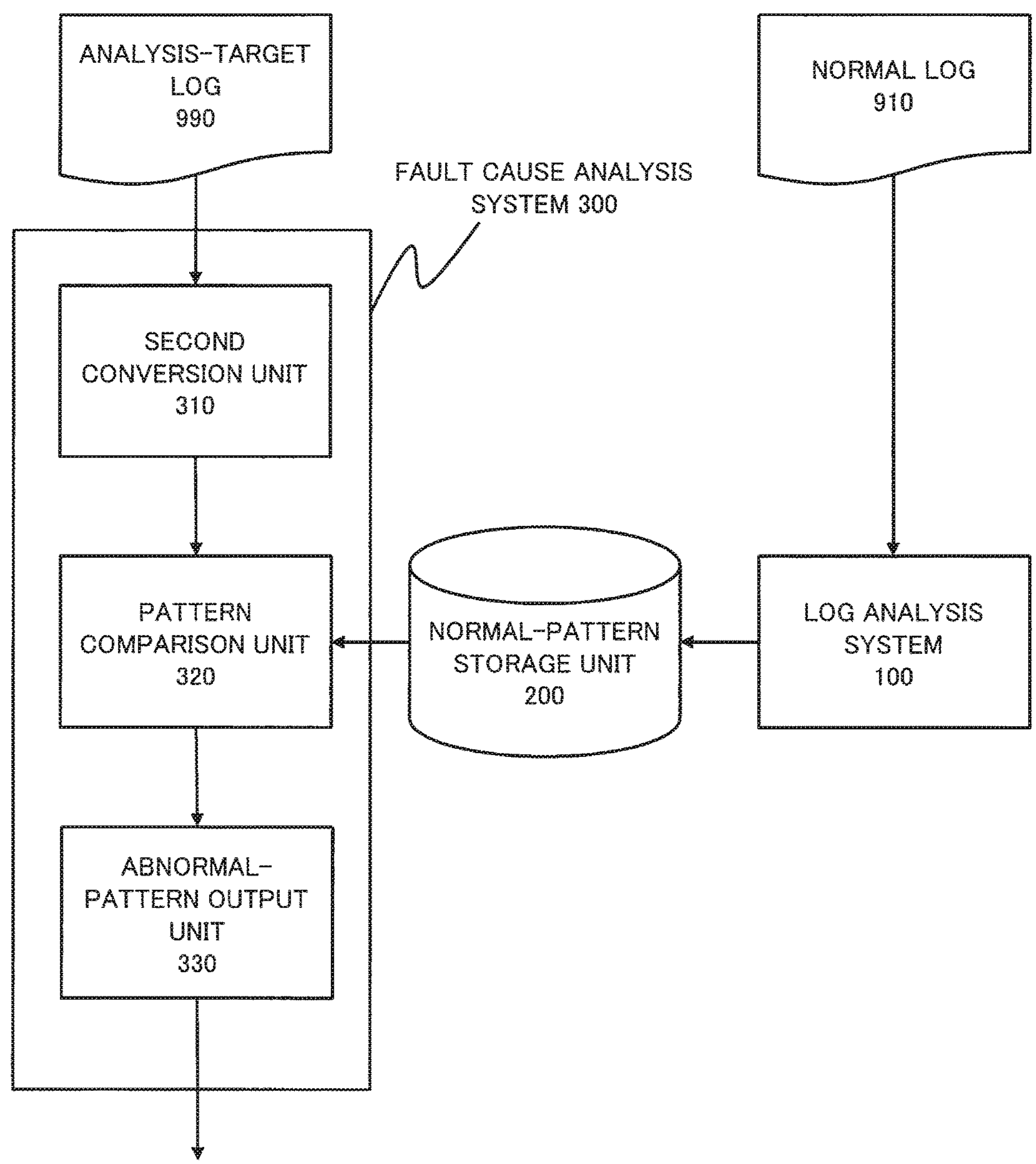
FIG. 15 is a block diagram illustrating a configuration of a fault cause analysis system 300 according to a third exemplary embodiment of the present invention.

FIG. 15 is a block diagram illustrating a configuration of a fault cause analysis system 300 according to a third exemplary embodiment of the present invention. The fault cause analysis system 300 includes a second conversion unit 310, a pattern comparison unit 320, and an abnormal-pattern output unit 330.

The second conversion unit 310 acquires an analysis-target log 990, which is an analysis-target log file and output by the information processing system 900. In the second conversion unit 310, "information for grouping a series of messages in units of process" selected by the selection unit 130 is registered in advance. The second conversion unit 310 extracts patterns from the analysis-target log 990 on the basis of the "information for grouping a series of messages in units of process".

The pattern comparison unit 320 compares a pattern obtained by conversion of the analysis-target log 990 by the second conversion unit 310, with the pattern stored in the normal-pattern storage unit 200. The pattern comparison unit 320 extracts, in the pattern obtained by the conversion of the analysis-target log 990, a pattern different from the normal pattern 920.

The abnormal-pattern output unit 330 outputs an abnormal part of the analysis-target log 990 on the basis of the result of the comparison performed by the pattern comparison unit 320.

The fault cause analysis system 300 according to the third exemplary embodiment extracts a message indicating a direct or indirect cause of a fault, from a huge amount of log output by the information processing system 900, and outputs the extracted message.

Fourth Exemplary Embodiment

Figure 16:
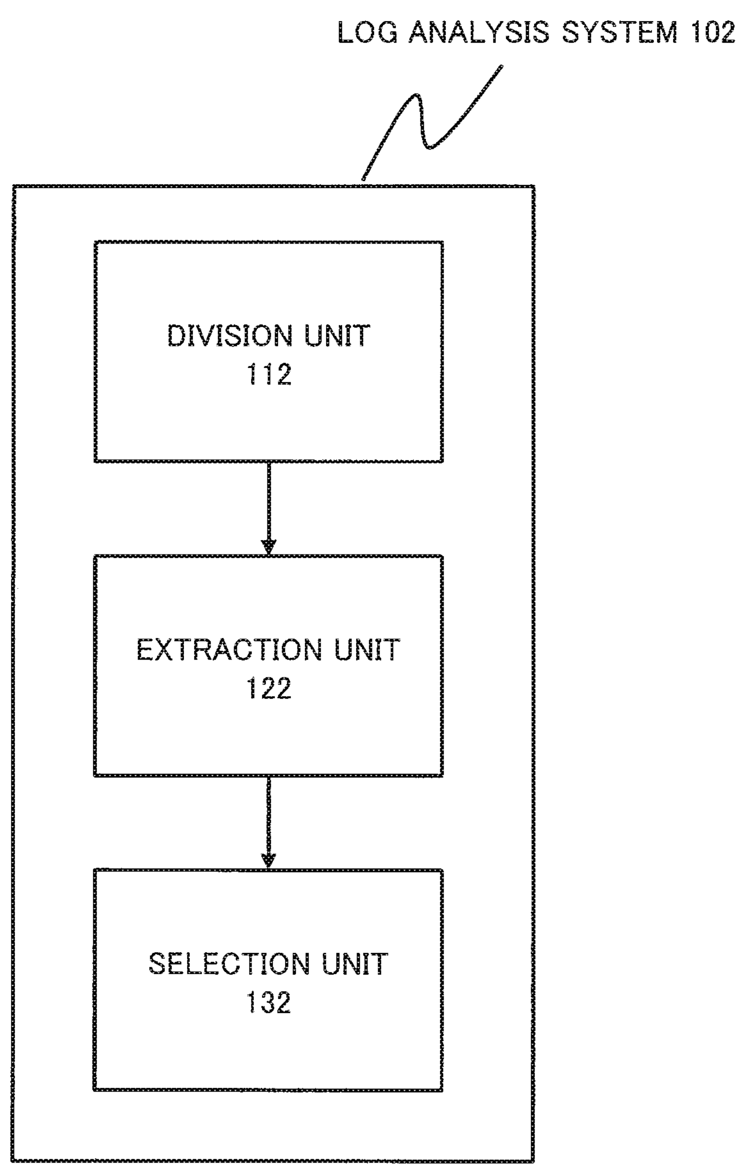
FIG. 16 is a flowchart illustrating operation of a log analysis system 102 according to a fourth exemplary embodiment of the present invention.

FIG. 16 is a block diagram illustrating a configuration of a log analysis system 102 according to a fourth exemplary embodiment of the present invention. As illustrated in FIG. 16, the log analysis system 102 includes a division unit 112, an extraction unit 122, and a selection unit 132.

The division unit 112 divides a log file into a plurality of log groups according to a predetermined rule. The log file includes information in which a plurality of log records, each of which is information in which an event is associated with the time point of the occurrence of the event, are aligned in time series. Each of the log groups is a set of a plurality of log records which are contiguous in time series.

The extraction unit 122 extracts a plurality of patterns each of which is formed with a plurality of events contiguous in time series, from the plurality of log groups, and associates each of the patterns with the frequency information indicating the number of log records from which each of the patterns is extracted.

The selection unit 132 selects a pattern to be extracted from the plurality of patterns. In this operation, the selection unit 132 selects the pattern on the basis of the inclusion relationship between a plurality of events which are contiguous in time series and with which a pattern is formed and a plurality of events which are contiguous in time series and with which another pattern is formed, and on the basis of the frequency information associated with the patterns.

It is possible to implement an appropriate combination of the above-described exemplary embodiments. The present invention is not limited to any of the above-described exemplary embodiments and may be implemented in various modes.

The separation of blocks presented in each of the block diagrams is a configuration presented for the purpose of illustration. The present invention described by using each of the exemplary embodiments as an example is not limited, for the implementation, to the configurations presented in the block diagrams.

The exemplary embodiments to carry out the present invention are described above. However, the above-described exemplary embodiments are provided for making the understanding of the present invention easy, and are not to intend limited interpretation of the present invention. Changes and improvements can be made to the present invention without departing from the gist of the present invention, and the equivalents are also included in the present invention.

The present application claims the priority based on Japanese Patent Application No. 2013-197416, filed on Sep. 24, 2013, the entire disclosure of which is incorporated herein.

REFERENCE SIGNS LIST

1 CPU
2 Memory
3 Storage device
4 Communication interface
5 Input device
6 Output device
7 Drive
8 Storage medium
100 Log analysis system
101 Log analysis system
102 Log analysis system
110 Division unit
112 Division unit
120 Extraction unit
122 Extraction unit
130 Selection unit
132 Selection unit
140 Normal-pattern extraction unit
150 Conversion unit
200 Normal-pattern storage unit
300 Fault cause analysis system
310 Second conversion unit
320 Pattern comparison unit
330 Abnormal-pattern output unit
900 Information processing system
910 Normal log
911 Normal log
920 Normal pattern
990 Analysis-target log

What is claimed is:

1. A log analysis method by a computer comprising:

dividing a log file including information in which log records are aligned in time series, in accordance with a predetermined rule, into a log groups each of which corresponds to a set of log records being contiguous in time series, each of the log records corresponding to information in which an event is associated with a time point of occurrence of the event, the log records being output from a target to be analyzed when the target is operating normally, the log file being a normal log output by an information processing device;

extracting patterns each of which is formed with events being contiguous in time series, from the log groups, and associates the patterns with frequency information indicating numbers of log records from which the patterns are extracted;

selecting a pattern to be output as a normal pattern, from the patterns on a basis of an inclusion relationship between events with which a pattern is formed and being contiguous in time series and events with which another pattern is formed and being contiguous in time series, and on a basis of frequency information associated with the patterns;

extracting information indicating an order and frequency of execution of the process from a log file to be analyzed which is output by the information processing device;

comparing a pattern to be analyzed with the normal pattern, the pattern to be analyzed being extracted from the log file to be analyzed based on the extracted information;

extracting a pattern different from the normal pattern as an abnormal pattern from the pattern to be analyzed; and outputting an abnormal part of the log file to be analyzed based on the abnormal pattern, wherein the extracted abnormal pattern improves identification of a message of a plurality of messages within the log file that indicates a cause of a fault within the information processing device that output the log file, each message corresponding to an event that has occurred in the information processing device and an occurrence time of the event.

2. A non-transitory computer readable recording medium that stores a program causing a computer to execute:

processing of dividing a log file including information in which log records are aligned in time series, in accordance with a predetermined rule, into log groups each of which corresponds to a set of log records being contiguous in time series, each of log records corresponding to information in which an event is associated with a time point of occurrence of the event, the log records being output from a target to be analyzed when the target is operating normally, the log file being a normal log output by an information processing device;

processing of extracting patterns each of which is formed with events being contiguous in time series, from the log groups, and associating the patterns with frequency information indicating numbers of log records from which the patterns are extracted;

processing of selecting a pattern to be output as a normal pattern, from the patterns on a basis of an inclusion relationship between events with which a pattern is formed and being contiguous in time series and events with which another pattern is formed being contiguous in time series, and on a basis of frequency information associated with the patterns;

processing of extracting information indicating an order and frequency of execution of the process from a log file to be analyzed which is output by the information processing device;

processing of comparing a pattern to be analyzed with the normal pattern, the pattern to be analyzed being extracted from the log file to be analyzed based on the extracted information;

processing of extracting a pattern different from the normal pattern as an abnormal pattern from the pattern to be analyzed; and processing of outputting an abnormal part of the log file to be analyzed based on the abnormal pattern, wherein the extracted abnormal pattern improves identification of a message of a plurality of messages within the log file that indicates a cause of a fault within the information processing device that output the log file, each message corresponding to an event that has occurred in the information processing device and an occurrence time of the event.

3. A fault cause analysis system comprising:

a memory storing a set of instructions; and at least one processor configured to execute the instructions to:

divide a log file including information in which log records are aligned in time series, in accordance with a predetermined rule, into log groups each of which corresponds to a set of log records being contiguous in time series, each of the log records corresponding to information in which an event is associated with a time point of occurrence of the event, the log records being output from a target to be analyzed when the target is operating normally, the log file being a normal log output by an information processing device;

extract patterns each of which is formed with events being contiguous in time series, from the log groups, and associate the patterns with frequency information indicating numbers of log records from which the patterns are extracted;

select a pattern to be output as a normal pattern, from the patterns, on a basis of an inclusion relationship between events with which a pattern is formed and being contiguous in time series and events with which another pattern is formed and being contiguous in time series, and on a basis of frequency information associated with the patterns;

extract information indicating an order and frequency of execution of the process from a log file to be analyzed which is output by the information processing device;

compare a pattern to be analyzed with the normal pattern, the pattern to be analyzed being extracted from the log file to be analyzed based on the extracted information;

extract a pattern different from the normal pattern as an abnormal pattern from the pattern to be analyzed; and output an abnormal part of the log file to be analyzed based on the abnormal pattern, wherein the extracted abnormal pattern improves identification of a message of a plurality of messages within the log file that indicates a cause of a fault within the information processing device that output the log file, each message corresponding to an event that has occurred in the information processing device and an occurrence time of the event.

4. The fault cause analysis system according to claim 3, wherein the log file is based on information output by an information processing device being the target and being capable of generating events in a predetermined order on a basis of a process to carry out, and the at least one processor is further configured to:

select a pattern including exactly a series of events generated in response to a particular process being carried out.

5. The fault cause analysis system according to claim 4, wherein, the at least one processor is further configured to:

analyze a parent-child relationship in the patterns, and select a pattern to be output from the plurality of patterns on a basis of reliability degree, a support degree, or a lift value between a parent pattern and a child pattern, the parent pattern of one pattern being an other pattern formed with events whose subset is events with which the one pattern is formed, the child pattern of the other pattern being the one pattern, the pattern with which the one pattern is formed being contiguous in time series, the patterns with which the other pattern is formed being contiguous in time series.

6. The fault cause analysis system according to claim 4, wherein, the at least one processor is further configured to:

analyze a parent-child relationship in the patterns, and preferentially select a child pattern having a larger number of parent patterns than a predetermined threshold value, the parent pattern of one pattern being an other pattern formed with events whose subset is events with which the one pattern is formed, the child pattern of the other pattern being the one pattern, the pattern with which the one pattern is formed being contiguous in time series, the patterns with which the other pattern is formed being contiguous in time series, each of the parent patterns corresponding to the parent pattern.

7. The fault cause analysis system according to claim 4, wherein, the at least one processor is further configured to:

analyze a parent-child relationship in the patterns, and preferentially select a pattern, the pattern having both a parent pattern and a child pattern, a ratio of frequency of the pattern to frequency of the parent pattern being smaller than a first threshold value, a ratio of frequency of the child pattern to frequency of the pattern being larger than or equal to a second threshold value, the parent pattern of one pattern being an other pattern formed with events whose subset is events with which the one pattern is formed, the child pattern of the other pattern being the one pattern, the pattern with which the one pattern is formed being contiguous in time series, the patterns with which the other pattern is formed being contiguous in time series.

8. The fault cause analysis system according to claim 4, wherein the at least one processor is further configured to:

preferentially select a pattern, the pattern being formed with events whose number is larger than a predetermined threshold value and being associated with a frequency higher than a predetermined threshold value, the events being contiguous in time series.

* * * * *